(12) United States Patent
Secundo et al.

(10) Patent No.: US 7,119,334 B2
(45) Date of Patent: Oct. 10, 2006

(54) THERMAL IMAGING SYSTEM AND METHOD

(75) Inventors: Lavi Secundo, Tel Aviv (IL); Yoram Lubianiker, Tel Aviv (IL)

(73) Assignee: Namal Technologies Ltd., Tel Aviv (IL)

( * ) Notice: Subject to any disclaimer, the term of this patent is extended or adjusted under 35 U.S.C. 154(b) by 148 days.

(21) Appl. No.: 10/698,463

(22) Filed: Nov. 3, 2003

(65) Prior Publication Data

US 2005/0092924 A1    May 5, 2005

(51) Int. Cl.
*G01J 5/00*    (2006.01)
(52) U.S. Cl. .................. 250/331; 374/121; 374/133
(58) Field of Classification Search ............... 250/330, 250/331, 332, 338.1, 338.3, 338.4, 352, 370.08, 250/252.1, 208.1; 374/121, 133
See application file for complete search history.

(56) References Cited

U.S. PATENT DOCUMENTS

| | | | | |
|---|---|---|---|---|
| 4,002,902 | A | * | 1/1977 | Donjon et al. ......... 250/214 LA |
| 4,594,507 | A | * | 6/1986 | Elliott et al. ................ 250/331 |
| 4,688,900 | A | * | 8/1987 | Doane et al. .................. 349/87 |
| 4,758,060 | A | * | 7/1988 | Jaeger et al. .................. 385/12 |
| 4,959,546 | A | * | 9/1990 | Bly ............................ 250/330 |
| 5,021,663 | A | * | 6/1991 | Hornbeck .................... 250/349 |
| 5,559,332 | A | * | 9/1996 | Meissner et al. ......... 250/338.2 |
| 5,792,377 | A | * | 8/1998 | Belcher et al. ................ 216/87 |
| 6,238,085 | B1 | * | 5/2001 | Higashi et al. ................ 374/10 |
| 6,245,591 | B1 | * | 6/2001 | Beratan et al. ............... 438/55 |
| 6,791,610 | B1 | * | 9/2004 | Butler et al. ................ 348/297 |

OTHER PUBLICATIONS

"Handbook of Optics—Fundamentals Techniques and Design", Michael Bass, Eric W. Van Stryland, David R. Williams, William L. Wolfe (Editors), McGraw Hill 1995, (2nd edition), vol. 1 Chapters 15-19.
"Un-cooled Thermal Imaging: Arrays Systems, and Applications" by Paul W. Kruse, SPIE, 2001.
"Introduction to Photorefractive Nonlinear Optics", by Pochi Yeh, Wiley& Sons, USA, 1993, pp. 26-29.

* cited by examiner

*Primary Examiner*—David Porta
*Assistant Examiner*—Faye Boosalis
(74) *Attorney, Agent, or Firm*—Mark M. Friedman

(57) ABSTRACT

Systems and methods for thermal sensing and imaging using the electro-optic effect. A thermal detection system comprises a temperature sensing element that includes an electro-optic (EO) material layer having a length axis and characterized by a temperature dependent index of refraction, an electrical mechanism for inducing a chance in the index of refraction, a laser beam propagating lengthwise through EO layer for probing the refraction index change, and a light intensity meter for measuring a laser beam intensity change caused by the temperature dependent refraction index change. Thermal imaging is obtained by using a pixel array of such thermal sensing elements. The intensity reading may be done in either a cross-polarizer or a Mach Zehnder Interferometry reading configuration.

55 Claims, 11 Drawing Sheets

THERMAL IMAGING SYSTEM AND METHOD

FIELD OF THE INVENTION

The present invention relates to remote sensing of heat emitted by bodies, namely, the detection of temperature from a distance by optical means. More specifically, the present invention is of a thermal imaging system and method for detecting thermally induced changes in an electro-optic (EO) material.

BACKGROUND OF THE INVENTION

The detection of temperature can in general be performed by a single detector, or by an array of such detectors. A single detector may be used in various applications, e.g. as a motion detector. A detector array is used to yield a thermal picture (image) of the observed scene. Such thermal imaging systems are very useful in night vision (e.g., for military use), as driving aids and in heat measurements (e.g. in fire alarm systems). Thermal detectors are implemented using a number of technologies, some of which (e.g., thermo-couples) require direct contact with the measured object, and are therefore unsuitable for long distance measuring and imaging. Virtually all of the remote sensing techniques are based on the detection of IR radiation generated by the observed object, and the transformation of this radiation into an electrical signal.

Generally speaking, there are two classes of detectors: The first class may be termed 'photonic' detectors. These detectors use the same principle as photodetectors in the visible range, i.e., the photons that are incident upon the detector excite free charge carriers that generate an electrical current. However, due to the low energy of IR photons, these detectors require cooling (typically to 77° K), to suppress the current generated by the thermal excitations within the detector (the "dark" current signal). Details about thermal imaging systems in general, and cooled systems in particular may be found for example in "Handbook of Optics—Fundamentals Techniques and Design", Michael Bass, Eric W. Van Stryland, David R. Williams, William L. Wolfe (Editors), McGraw Hill 1995, ($2^{nd}$ edition), Vol. 2 Chapters 15–19, which is incorporated herein by reference.

The second class of detectors may be termed thermal energy sensors (TES). Their operating principle is based on sensing the thermal heat generated by the IR radiation emitted by the object and incident upon the detector. A TES converts the IR radiation emitted by the object into heat, and senses the temperature change that this heat causes in the device. A TES is constructed of three elements: (i) means for converting the incident (IR) radiation into heat; (ii) a sensing element of which a certain physical property is very sensitive to temperature changes; and (iii) an apparatus for measuring this property. In principle, a TES does not require cooling for its operation, and can therefore serve as a central element in un-cooled thermal imaging systems. However, it should be noted that a TES is very sensitive to the heat it exchanges with its environment. It is obviously desirable that the small amount of heat produced by the IR radiation absorbed by the TES during one sampling period will generate a maximum change in the temperature of the TES sensing element. Therefore, the TES is constructed to have minimal heat capacity, and to have a much faster thermal response to the heat generated by the absorbed radiation than to the heat that flows into it from its immediate surroundings. A good reference describing TES detectors is "Un-cooled Thermal Imaging: Arrays Systems, and Applications" by Paul W. Kruse, SPIE, 2001, which is incorporated herein by reference The two most popular implementations of TES are the pyroelectric and the bolometric detectors. The first uses ferroelectric materials, in which the electric polarization is temperature dependent. In some cases, the material is designed to work slightly below the ferroelectric—paraelectric phase transition, where the temperature sensitivity is highest (this is sometimes called the "enhanced pyroelectric effect"). In either the "regular" pyroelectric or the enhanced pyroelectric case, there is a transient current with the change of temperature (due to the change in electrical polarization), which can be measured and used to determine the device temperature.

In the case of bolometric detectors, the physical property that changes with temperature is the resistivity, which is measured with a relatively simple electric circuit. However, since the changes in temperature are quite small, the change in resistivity is difficult to measure. This problem is particularly significant in un-cooled systems.

In summary, there are two classes of thermal imaging systems: (i) cooled systems that are predominantly but not exclusively based on photonic detectors, these systems being in general more expensive, but yielding better performance due to a lower noise level; and (ii) un-cooled systems that are based on thermal energy sensors. Presently known un-cooled systems suffer from low sensitivity and a higher level of noise (which is manifested in a higher value of Noise Equivalent Temperature Difference, NETD), but are considerably cheaper than cooled systems. Both classes of thermal imaging systems are described in the Handbook of Optics and Uncooled Thermal Imaging references above.

As mentioned above, the major drawback of un-cooled TES systems is their relatively high level of noise, which limits their performance. There are several reasons for this relatively high noise. First, the fact that the detector is at high temperature (=room temperature) leads to relatively large fluctuations in its black body radiation. Second, the sampling time in bolometric detectors is quite small due to Joulean heat that develops during the reading process. Third, a chopper is introduced in pyroelectric detectors, which means that about half of the IR radiation is lost. Fourth, the current in pyroelectric detectors is a transient one, and thus the sampling time is limited by the electrical RC time constant. Typical NETD values in both pyroelectric and bolometric techniques are between 50–100 mK. Improvements over the last 20 years have led only to a slight decrease in the NETD.

There is therefore a widely recognized need for, and it would be highly advantageous to have un-cooled thermal detectors with a lower level of noise than existing at present.

SUMMARY OF THE INVENTION

The present invention discloses novel TES elements and systems and method of using same. The novel TES may be used in either cooled or uncooled systems. In particular, the present invention discloses a thermal detector and detector array that utilize a TES in which the index of refraction is very sensitive to (i.e. changes dramatically with) temperature changes, with a special optical architecture for measurement of these index of refraction changes. Each TES in the array is made of a temperature sensitive element (TSE) coated with a radiation absorbing layer, and coupled through a thermal resistor to a heat sink. The radiation is typically infrared (IR) radiation, used in thermal imaging systems.

However, with the appropriate absorber the TSE of the current invention may be used to detect radiation of other wavelengths of the electro-magnetic spectrum, such as ultraviolet (UV). The description continues with reference to IR radiation only, with the understanding that the invention may be applicable to TES having an absorbing layer optimized for other types of radiation. The TSE is made of an electrooptic (EO) material in which the index of refraction changes upon the application of an electric field to an extent that is very sensitive to temperature changes. Hence, small temperature changes that are created in the element by the IR absorbing layer generate changes in its birefringence. A light beam that propagates through the device is affected by these birefringence changes through their effect on its phase. This effect can be detected through light intensity measurements using either optical polarization or interference measurement techniques:

Polarization measurement—the TES is placed between two crossed polarizers. Hence, the intensity of the light beam that propagates through the TES will vary as a result of the birefringence changes in the TES. In this case, it is essential that the material is birefringent, because this enables the change in the state of polarization.

Interference measurement—the TES is incorporated as one arm of an interferometer. Hence, the light intensity at the output of the interferometer will vary as a result of the birefringence changes in the TES. In this case, while the material is birefringent, what is actually used is the fact that the index of refraction changes. This change in the index of refraction alters the speed of light inside the material, and thus the phase of the beam traveling along the arm that includes the TES. This change in phase shifts the interference pattern, and leads therefore to a different reading of the light intensity at a specific point in space.

In a detector array, the detectors are arranged in the focal plane of the optical system as a linear array of columns of detectors that form together a 2-dimensional (2D) X-Y array. At each sampling operation, an electric field is applied to all the detectors belonging to one row in the array (namely, to all the detectors in the array that have the same index in their respective columns). A separate light beam propagates through each column. The sensing circuit that measures the light intensity at the output of each column senses only the birefringence changes that are generated in the element to which the field is applied. Thus, in each sampling operation, a row of detectors is sampled without individual electrical contact to each element in the row.

The reduction to practice of the new concept (see below) proves that we can utilize a thermal link with high thermal resistivity, so that the IR radiation induces a temperature increase, which is compatible with the state of the art systems. The virtual absence of electrical noise, the lack of Joulean heating, the relatively large Fill Factor and, most importantly, the higher sampling time of each pixel guarantee improved performance of the detector and/or detectors array.

According to the present invention there is provided a thermal detection system comprising: a temperature sensing element (TSE) that includes an electro-optic (EO) material layer having a length axis and characterized by an index of refraction; an electrical mechanism for inducing a change in the index of refraction, the index change correlated with the temperature of the TSE; and an optical reading mechanism for reading the refraction index change, thereby providing a reading of the TSE temperature.

According to the present invention there is provided a thermal detection system comprising: a temperature sensing element (TSE) that includes an electro-optic (EO) material layer having a length axis and characterized by an index of refraction; an electrical mechanism for inducing a change in the index of refraction, the index change corresponding to a temperature of the TSE; an optical reading mechanism that includes a laser beam propagating through the EO layer along the length axis and having a light intensity that changes as a result of the refraction index change; and a power meter for measuring the light intensity change, whereby the detected light intensity change indicates the temperature of the TSE.

According to the present invention there is provided a thermal imaging system having an array of pixels arranged in columns and rows, the system comprising: a plurality of temperature sensing elements (TSE) each having an electro-optic (EO) material layer with a length axis and characterized by an index of refraction; an electrical mechanism for inducing a change in the index of refraction of each individual TSE, the refraction index change correlated with a temperature of the individual TSE; a plurality of dummies, wherein the electrical mechanism is are applied to a pair composed of a TSE and a dummy; and an optical reading mechanism applied simultaneously to the TSE and the dummy of the pair, to measure their respective refraction index, thereby providing a reading of a temperature difference between the TSE and the dummy.

According to the present invention there is provided a method for radiation sensing comprising the steps of: providing a temperature sensing element (TSE) that includes an electro-optic (EO) material layer having a length axis and characterized by an index of refraction; exposing the TSE to radiation, thereby affecting the temperature of the EO material; electrically inducing a change in the index of refraction, the change correlated with the TSE temperature; and optically reading the refraction index change, thereby providing a reading of the TSE temperature.

According to the present invention there is provided a method for thermal imaging comprising the steps of: providing a plurality of temperature sensing elements (TSEs), each the TSE having an electro-optic (EO) material layer with a length axis and characterized by an index of refraction; providing a plurality of dummies, wherein the TSEs and the dummies are arranged in respective alternating adjacent TSE and dummy columns; electrically inducing a change in the index of refraction of each the TSE, the refraction index change correlated with a temperature of the TSE; and optically reading each the TSE refraction index change, thereby providing a reading of each the TSE temperature.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

The thermal detector (or "thermal detection system") of the present invention is based on a thin film of an electro-optical (EO) material, which is affected by the IR radiation emitted by the object to be observed. The temperature of the EO material increases due to the absorbance of this IR radiation. The reading of a signal correlated with this temperature increase is performed using a laser beam that propagates in the EO material plane. By applying an electric field, the index of refraction of the EO material changes through the EO effect. Since the magnitude of this change depends on the temperature, it is possible to determine the IR radiation intensity via the magnitude of the EO effect. Preferably, the detector is operated at temperatures where the sensitivity of the EO effect to temperature changes is high. The above-mentioned reading principle can be used in a single detector (to determine the existence of an object), or in an array of detectors (to form a complete image of objects in space, their shape and location). We now turn to discuss this general principle in more details.

Figure 1:
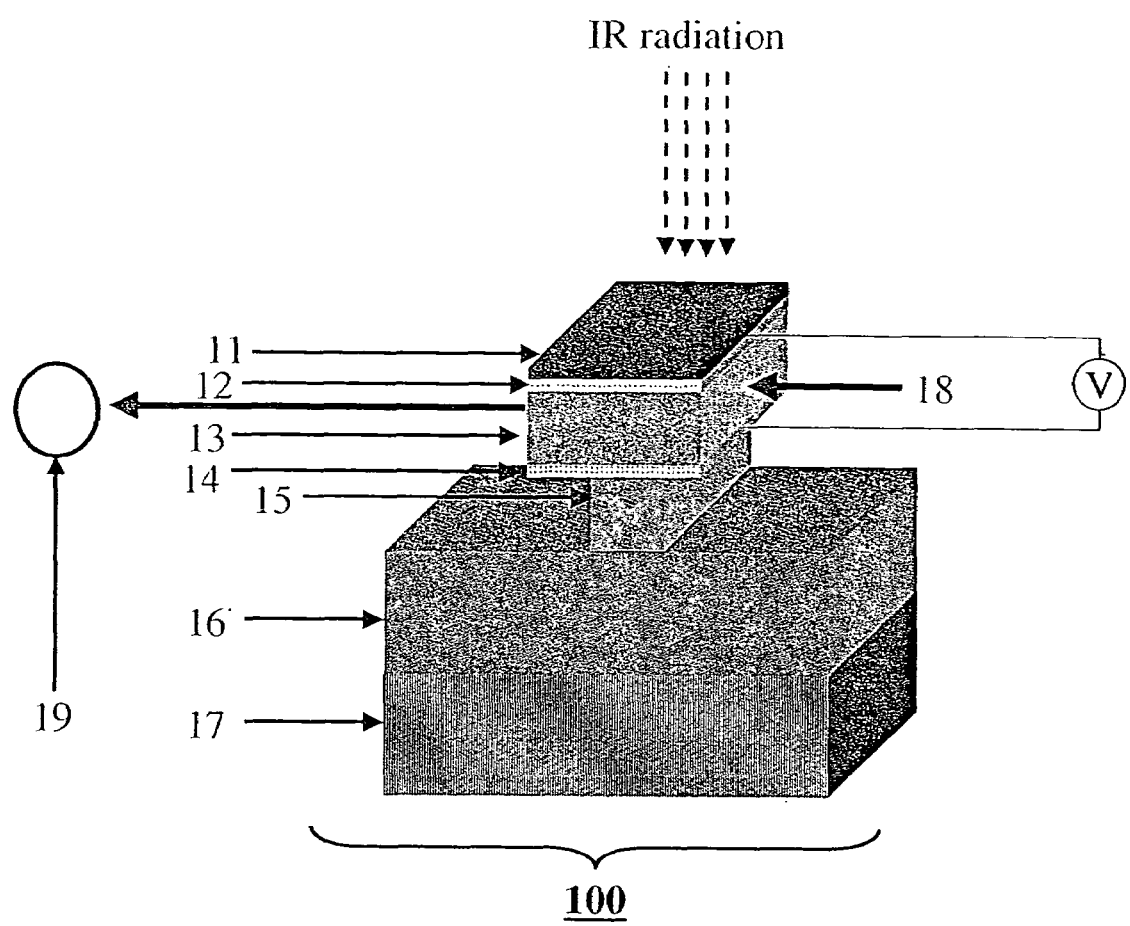
FIG. 1 shows a schematic description of the most basic thermal detector of the current invention.

FIG. 1 shows a schematic description of the most basic embodiment of a thermal detector according to the present invention. An object (not shown) produces IR radiation that impinges upon a detector 100. Detector 100 comprises an absorbing top layer 11 and an innovative, thermally sensitive element (TSE) 13, preferably in the form of a thin layer made of an electro-optic (EO) material with temperature dependent optical properties, in particular a temperature dependent refraction index. Top layer 11 has a high absorption coefficient for IR radiation, high thermal conductivity and a low thermal capacity, and is used to transform the IR radiation to heat, which is transferred to thermally sensitive element 13. The index of refraction of element 13 changes under the application of an electric field. Thin layer EO element 13 is sandwiched between a top electrode 12 and a bottom electrode 14, the electrodes enabling the application of the electric field from a source V, the electrodes and source V thus comprising an electrical mechanism for inducing a change in the index of refraction of EO element 13. The extent of the change in the index of refraction depends on the temperature of the TSE 13, and in particular on the IR radiation absorbed in layer 11.

All these layers are located on top of a thermal link 15, which is connected to a thermally conducting substrate 16 and a temperature controller 17. Controller 17, e.g. a Thermo-Electric Cooler (TEC), enables us to treat substrate 16 as a heat sink. Thermal link 15 must have a high thermal resistivity, to enable a significant temperature difference between substrate 16 and element 13. Element 13 is further characterized by having a low thermal resistivity, so that its temperature is uniform, and it can be viewed as a heat capacitor.

Figure 2:
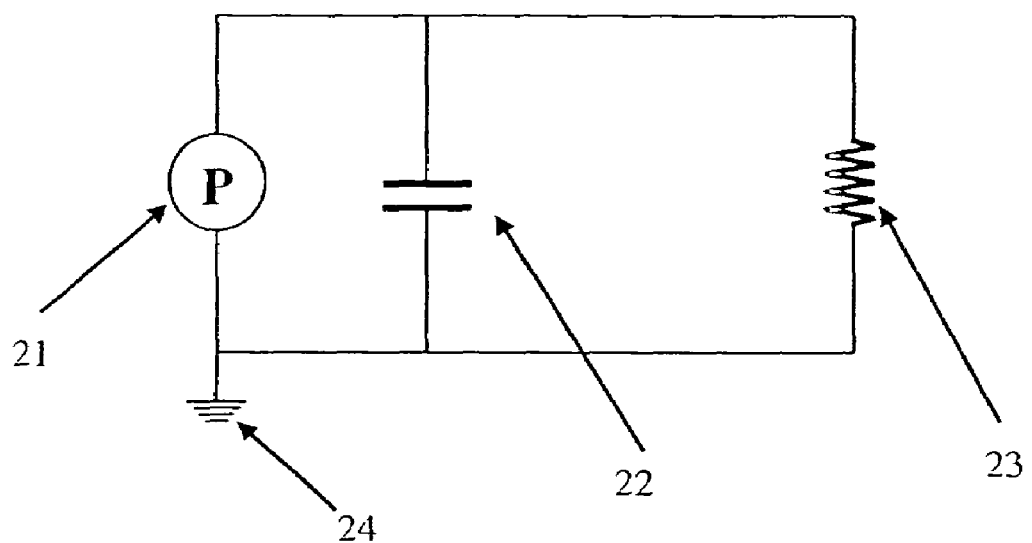
FIG. 2 shows an equivalent thermal circuit of the detector of FIG. 1.

FIG. 2 shows an equivalent thermal circuit of the detector of FIG. 1. A power source 21 is an equivalent of layer 11, which absorbs the radiation. A heat capacitor 22 represents the thermally sensitive thin layer EO element 13, and a thermal resistor 23 represents thermal link 15. A ground 24 is defined by heat sink 16. FIG. 2 also defines the requirements from the different elements in FIG. 1: the heat capacity of all the elements of the detectors should be small with respect to that of the thin layer EO element 13, and the heat resistance of all the elements of the detector must be negligible with respect to that of link 15.

Having defined the structure of this basic embodiment of the thermal detector of the present invention, we now turn to another innovative feature in FIG. 1, which is the optical reading mechanism of the temperature change through a laser beam 18. The beam travels through the EO material (element 13), so the latter must therefore be transparent to the wavelength of the laser. The application of an electric field changes the index of refraction tensor of EO material 13. The magnitude of this change is a function of the temperature increase induced by the IR radiation. These changes affect the properties (e.g., phase, state of polarization) of the laser beam that travels through the EO material. The change in these properties is then measured through its effect on the light intensity using a power meter 19, FIG. 1, which is another element of the optical reading mechanism. It should be noted that additional optical elements are required to enable the transformation of the change in the optical properties of the beam into light intensity dependence. These elements are discussed below. Consequently, the intensity of the IR radiation can be determined through the measurement of the light intensity of the reading beam.

We now define two major configurations for the optical reading, each of which will be later included in several additional specific embodiments. The first configuration includes crossed polarizers, while the second configuration utilizes a Mach-Zehnder Interferometer (MZI). We now discuss each of these two configurations in general terms, and defer more specific analysis to the embodiments below.

Figure 3A:
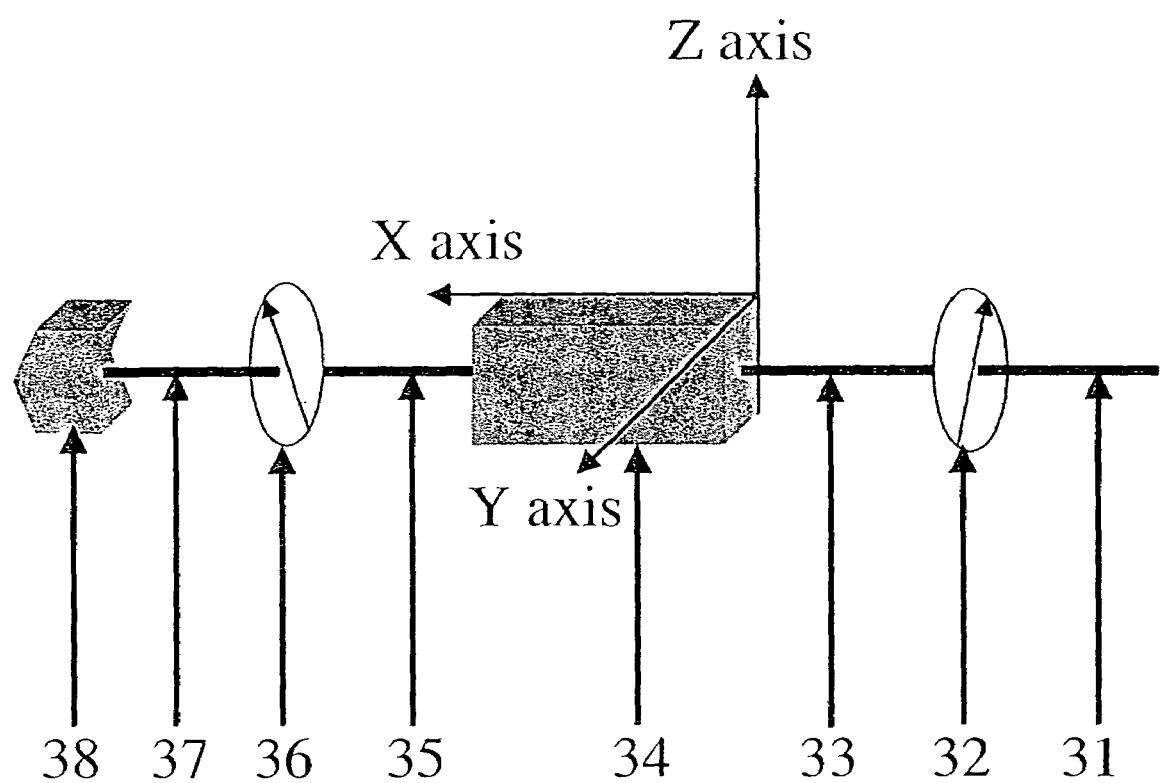
FIG. 3a shows a crossed-polarizers configuration for reading of a detector output.
Figure 3B:
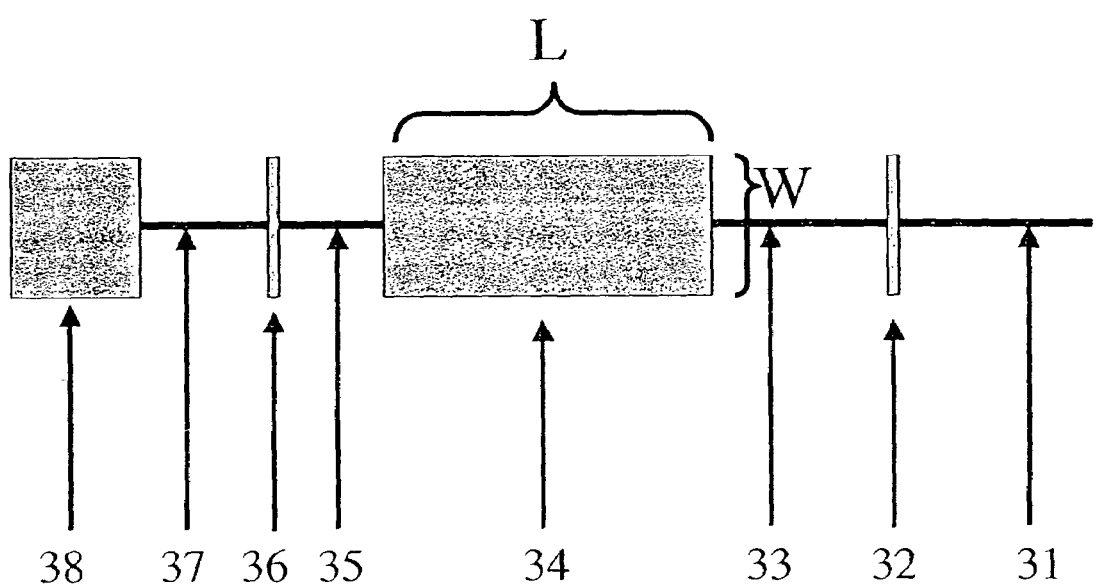
FIG. 3b shows a top view of the same detector.

The crossed-polarizers configuration is shown schematically in FIG. 3a. For the simplicity of the presentation, the thermal detector of FIG. 1 has been reduced here (and in FIGS. 4–6) to an EO layer 34. We start by defining a set of coordinates that will serve us throughout this disclosure. We denote by Z the axis perpendicular to the electrodes of the EO material, by X the axis of the laser beam propagation, and by Y an axis perpendicular to both Z and X. The Z-Y plane defines a facet of EO layer 34 on which the laser beam 33 impinges, whereas the X-Y plane defines the facet on which the IR radiation impinges. In the general case where the X-Y facet is rectangular, the rectangle has a length dimension (along X) "L" and a width dimension (along Y) "W", as demonstrated in FIG. 3b. The laser beam is applied perpendicularly to the Z-Y plane facet, along a "length axis" of the EO layer that coincides with X, thus traversing the EO material along its length dimension L. This means that the state of polarization of the beam is then defined within the Y-Z plane. Note that in all cases and in all embodiments, the beam travels the length of layer 13 parallel to the X-Y plane and perpendicular to the layer thickness, thus utilizing the largest dimension and the full volume of the EO material.

We now place crossed linear polarizers along the beam path, a first polarizer 32 in front of the detector (EO material 34), and a second polarizer 36 behind it. First polarizer 32 is set at 45° to the Z axis, so that the Z axis and Y axis components of beam 33 that reaches EO material 34 are equal. The light intensity, which is read at a power meter 38, is a direct measurement of the level of birefringence of the EO component of the detector. In the simplest case, the EO material is homogeneous in the absence of an electric field. In this case, the polarization of a beam 35 emerging from EO material 34 is the same as that of beam 33 entering this material, so that the light intensity of the beam 37 that emerges from the second polarizer and reaches power meter 38 is zero. This is because the second polarizer, which serves as the analyzer, is rotated by 90° with respect to the first polarizer.

Once the field is turned on, the index of refraction in the Z direction deviates from the one in the Y direction due to the EO effect, to an extent which is temperature dependent. We denote this difference by $\Delta n$. As a result, there is a phase difference between the (equal intensity) Y and Z components of the electromagnetic wave, which is given by:

$$\phi = \frac{2 \cdot \pi \cdot L}{\lambda} \Delta n \tag{1}$$

where L is the length of the EO material (in the X direction) and $\lambda$ is the wavelength of the reading beam 33. The polarization of beam 35 that emerges from the EO material is then not necessarily linear, and thus the light intensity measured at power meter 38 is not necessarily zero. In fact, it is given by:

$$I(\phi) = I_0\{1 + \sin(2\phi)\} = I_0 \cos^2 \phi \tag{2}$$

where $I_0$ is the intensity of the laser (assuming no losses along the optical path of the beam). Hence, the measured light intensity is a function of $\Delta n$, which by itself is a function of temperature, as explained above. Thus, the temperature of the EO material is measured via the light intensity measured at the power meter.

Figure 4:
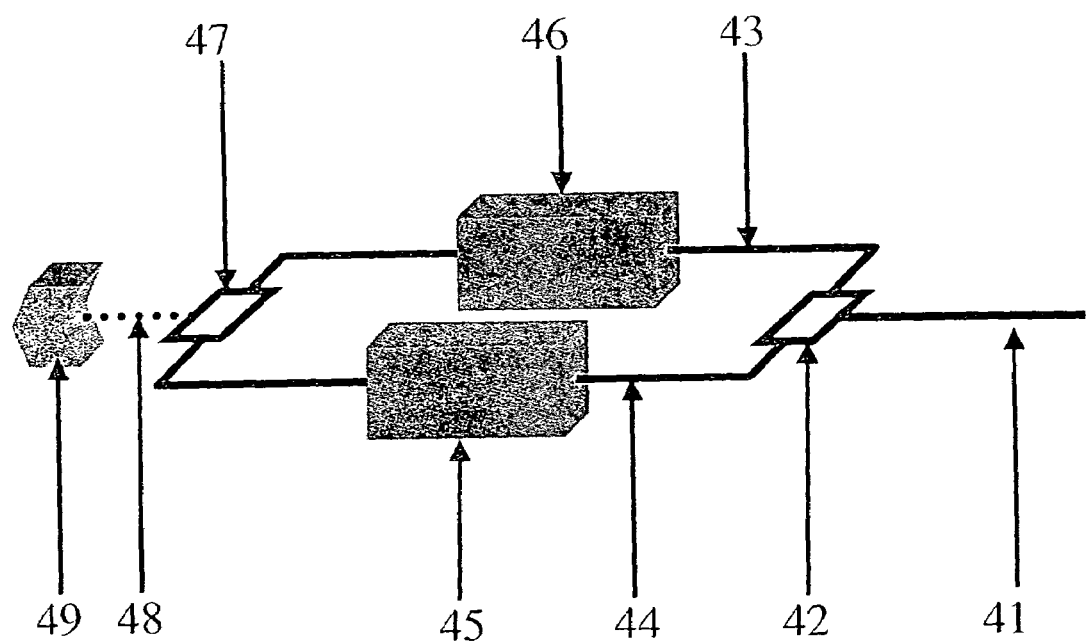
FIG. 4 shows a schematic description of a Mach Zehnder Interferometer (MZI) configuration for reading a detector output.

The MZI configuration is shown schematically in FIG. 4. The basic configuration includes an active detector 45 (referred to simply as the "detector") and a "dummy" detector 46 (referred to henceforth simply as the "dummy"). The dummy is generally identical to the active detector in all elements except for a missing top IR-absorbing layer (i.e. layer 11, FIG. 1). This makes the "dummy" totally immune to IR induced temperature changes. A laser beam 41 is polarized along the Z-axis, and a beam splitter 42 is used to divide the beam into two beams of preferably equal intensity, a reference beam 43, and a reading beam 44. The reading beam propagates through EO material 45, while the reference beam propagates through the "dummy" 46. The two beams are then brought to interfere (e.g., by a beam combiner 47), and a resulting single beam 48 is measured at a power meter 49. The light intensity at that point depends on the phase difference between the two paths. This phase difference originates from the difference in optical length of the two paths, and if the paths are made of identical physical length, the phase difference originates solely from a difference in index of refraction between the detector (EO material) and the "dummy". As explained above, the latter is a simple function of the temperature difference, and can thus be used to determine the intensity of the IR radiation that impinges upon the detector.

Although we stated that in general a dummy is identical to an active detector in all except the lack of a radiation absorber element, it is important to note that the "dummy" does not have to include an EO layer identical with that of the detector. In fact, the layer through which the laser reference beam travels in the dummy may be made of any transparent dielectric. Indeed, the reference beam may even propagate in free space. However, we prefer the usage of an "identical" EO dummy, since in this case it is easy to obtain the same intensity for the two beams (since the reflection intensity at all the interfaces is identical), and it is easy to null the phase difference in the absence of electric fields. Furthermore, even when electric fields are applied to the detector and the dummy, the phase difference is zero in the absence of IR radiation.

We now turn to discuss in detail a number of exemplary embodiments, which are based on these two configurations.

Embodiment 1

Embodiment 1 utilizes the crossed-polarizers configuration for a single detector, which is made of a paraelectric material as the EO ingredient. There are several paraelectric EO materials, such as $LiTaO_3$, $KTaO_3$, $KTa_{1-y}Nb_yO_3$ (known as KTN), $K_{1-x}Li_xTa_{1-y}Nb_yO_3$ (KLTN), $K_{1-x}Na_xTa_{1-y}Nb_yO_3$ (KNTN), this list being by no means complete.

Paraelectric materials are defined by the absence of spontaneous electrical polarization. Since the EO effect relates to the electrical polarization, it therefore follows that any changes in the index of refraction induced by the EO effect will be a function of the product of the applied electric field and the material's dielectric constant. In the mathematical analysis below we limit ourselves to the case where the paraelectric material is also centro-symmetric, in which case the EO effect is quadratic with respect to the applied field. It should be noted, however, that similar equations can be developed also for the linear EO, as indeed for any other functional form.

In the case of the quadratic effect, the electric field induced change in the index of refraction is given by:

$$n = n_0 + \frac{1}{2} n_0^3 g \varepsilon_0^2 \varepsilon^2 E_0^2 \tag{3}$$

Where $n_0$ is equilibrium index of refraction, g is the appropriate electrooptic coefficient; $\epsilon_0$ is the permitivity of the vacuum and $E_0$ the applied electric field (which may be dc, ac or of any other form). $\epsilon$, the dielectric constant of the material, is the only parameter in equation (3) which is temperature dependent, through the Curie—Weiss law:

$$\varepsilon = \frac{C_{cw}}{T - T_c} \tag{4}$$

Where $C_{cw}$ is the Curie—Weiss coefficient, which is material-dependent, and $T_C$ is the phase transition temperature. Below $T_C$, the EO material becomes ferroelectric, and the EO effect becomes linear with respect to the field. We defer treatment of ferroelectric materials to later Embodiments (4–6), and limit ourselves to temperatures above the ferroelectric-paraelectric phase transition, where equations (3) and (4) are valid.

It is clear from equation (4) that the $\epsilon$ dependence on T is particularly strong just above the phase transition temperature, and so it is preferable to set the heat sink to a temperature slightly (typically 2–5 degrees) above $T_C$. For room temperature operation this requires tailoring, of the material composition (e.g., the Ta/Nb ratio in KLTN), so that $T_C$ is just (2–5 degrees) below room temperature. Inserting (4) into (3) we obtain:

$$n = n_0 + \Delta n = n_0 + \frac{1}{2} \cdot n_0^3 \cdot g \cdot \varepsilon_0^2 \cdot Ccw^2 \cdot \left(\frac{E_0}{T - T_c}\right)^2 \quad (5)$$

Now, using the value of $\Delta n$ we can calculate the phase difference that evolves between the Z axis and Y axis components of the reading beam. This phase difference and the resulting light intensity measurement are given in equations (1) and (2). Inserting the result of (5), we obtain:

$$I = I_0 \cos^2\left\{\frac{\pi L n_0^3 g \varepsilon_0^2 c_{cw}^2 E_0^2}{\lambda} * \frac{1}{(T - Tc)^2}\right\} \quad (6)$$

Using equation (6) we can determine the temperature of the EO material through the measurement of the light intensity, since T is the only unknown parameter in (6).

We now turn to a specific example, to show reduction to practice. All element numbers in this example refer to elements in FIG. 1. In this specific example we use KLTN as the EO material, since this material posses a large EO coefficient. We set the temperature of the heat sink to ca. 5 degrees above the phase transition temperature, to ensure that we are well within the paraelectric phase. A thin (10 μm thick) film of KLTN is grown on a sacrificial substrate, e.g., crystalline Si. There are several growth techniques that can be used, such as sputtering, Liquid Phase Epitaxy (LPE), Metal-Organic Chemical Vapor Deposition (MOCVD), Pulsed Laser Deposition (PLD), and sol-gel deposition. Alternatively, the material can be grown in its bulk form (e.g., using the top seeded solution method), and polished down to the desired thickness. The area of the KLTN film is limited (using standard chemical engineering tools, such as photolithography, reactive ion etching and ion milling) to 50×50 μm. After the film is grown, a thin metal layer is evaporated, to form the bottom electrode (14 in FIG. 1). Then we grow a sacrificial layer (e.g., of Si ) that is also ca. 10 μm thick, on top of the metal contact. Using photolithography and Deep Reactive Ion Etching (DRIE), we form a "hole" in the middle of the detector area. The hole has a cross section of 2×2 μm, and a depth of 10 μm. This hole is then filled with a material with a high thermal resistivity (such as $SiO_2$) to form a pillar, which will serve as the thermal link (15). The entire structure is then attached to the top of a metallic (e.g., copper) surface that acts as a heat sink (16). Of course, the detector is placed with the $SiO_2$ pillars touching the metallic plate. We now use a wet etching process to remove both the sacrificial a-Si layer, and the original Si substrate. This is followed by the evaporation of the top metallic layer (12) and the subsequent absorber layer (11). The EO material (13) is then sandwiched between two electrodes. All that remains is to connect the two electrodes to a voltage source (which can be DC, AC, or any other form), and connect the heat sink to a temperature controller (17).

With the above-mentioned properties, the thermal resistance of the thermal link is about $2*10^6$ Deg/Watt. This means that under steady state conditions, the EO material will heat by 1° when a radiation of 0.5 μwatt is absorbed.

Having formed the detector, we can now look at some of its features. For KLTN, the equilibrium index of refraction is 2.18, the Curie—Weiss constant is roughly $10^5$, and the relevant electrooptic coefficients, g, is 0.16 meter$^4$/Coul$^2$. In a preferred embodiment, we chose (see above) L to be 50 μm, the reading beam wavelength to be 500 nm, and the applied electric field to be a DC field of 3.12 KV/cm. Inserting all these numbers into equation (6) yields:

$$I = I_0 \cos^2\left\{\frac{12.5\pi}{(5 + \delta T)^2}\right\} \quad (7)$$

where $\delta T$ is the temperature increase induced by the absorption of the IR radiation. Therefore, in the absence of IR radiation (i.e., when $\delta T=0$) the intensity, which is read at the detector, is zero (of course, the field was chosen to satisfy this requirement).

To relieve the restriction on the applied field (i.e., the requirement that the light intensity nulls when $\delta T=0$), we can add a calibrating mechanism (not shown) in series with the TSE. The calibrating mechanism may be a phase compensator, made for example of a passive birefringent material, the thickness of which is chosen so that the light intensity is zero at $\delta T=0$. Alternatively, the calibrating mechanism may be another IR insensitive EO material added in series with the TSE (a so called "serial dummy"), and the light intensity reading will be nulled through the voltage applied to the serial dummy.

Once IR radiation impinges upon the detector, the reading changes. For the example given above, a change of 1° C. in temperature will result in a measured intensity of 20% of the maximal intensity. This means our detector is quite sensitive. Higher sensitivities can be obtained by increasing the detector optical length, working closer to $T_C$, increasing the electric field, decreasing the reading beam's wavelength, and using a sensitive photodetector. On the other hand, the detector can be made less sensitive (by the opposite operations), so that a phase difference of 90° (=full scale) is obtained for a higher IR intensity. This will enable to correctly identify objects with a significant temperature differences. In a preferred embodiment, the physical properties of the detector (such as its length and the working temperature) are chosen to yield a sensitive detector. During operation, the user can chose the range of the full scale by altering the applied electric field, where a large field enables high sensitivity, whereas a small field enables a large scale and lower sensitivity.

It should be obvious that this calibrating mechanism is merely an optional addition to the system. The temperature detection is conducted through the comparison of the light intensity measurement with and without IR radiation. It is convenient that the latter will be equal to zero. However, it is also possible to work under different conditions, provided that-the appropriate calibration is performed.

Embodiment 2

Embodiment 2 is in principle similar to Embodiment 1, with the addition of an extra dummy, which is placed in parallel to the detector (a "parallel dummy"). The role of the parallel dummy is to extract a reference readout signal, which will be subsequently used to null any contribution that is not associated with the IR radiation induced temperature increase. In a preferred embodiment, the parallel dummy is identical to the detector in all parameters, with the exception of the IR absorbing layer. The parallel dummy is placed near the detector, so that both are supported by the same temperature controller.

Figure 5:
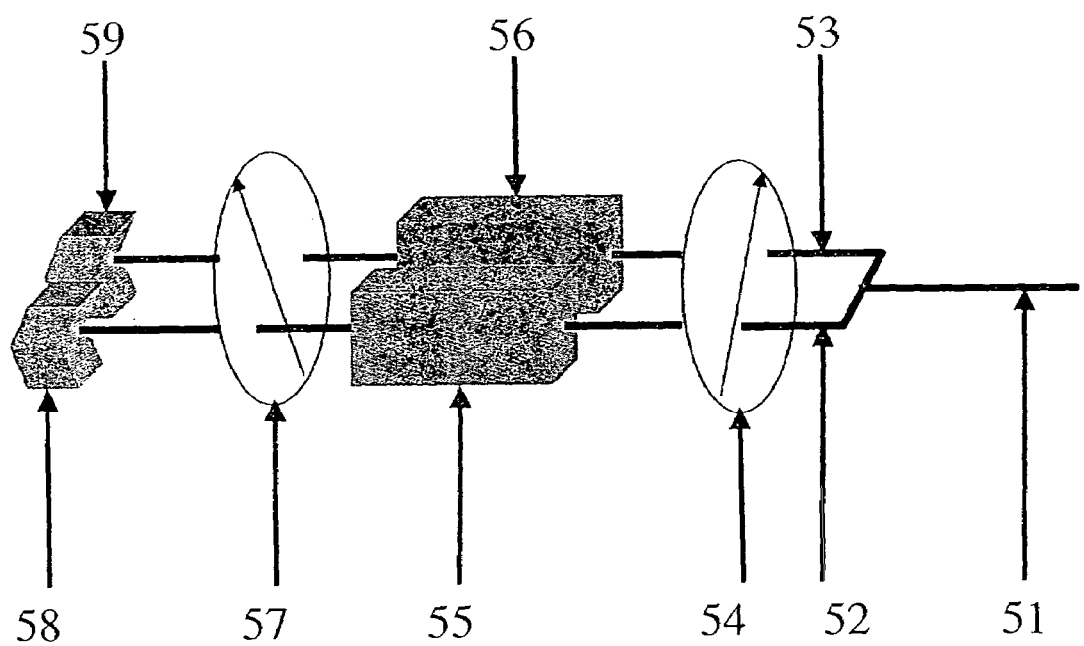
FIG. 5 shows schematically the mode of operation of a single detector plus parallel dummy in a crossed-polarizers configuration.
Figure 6:
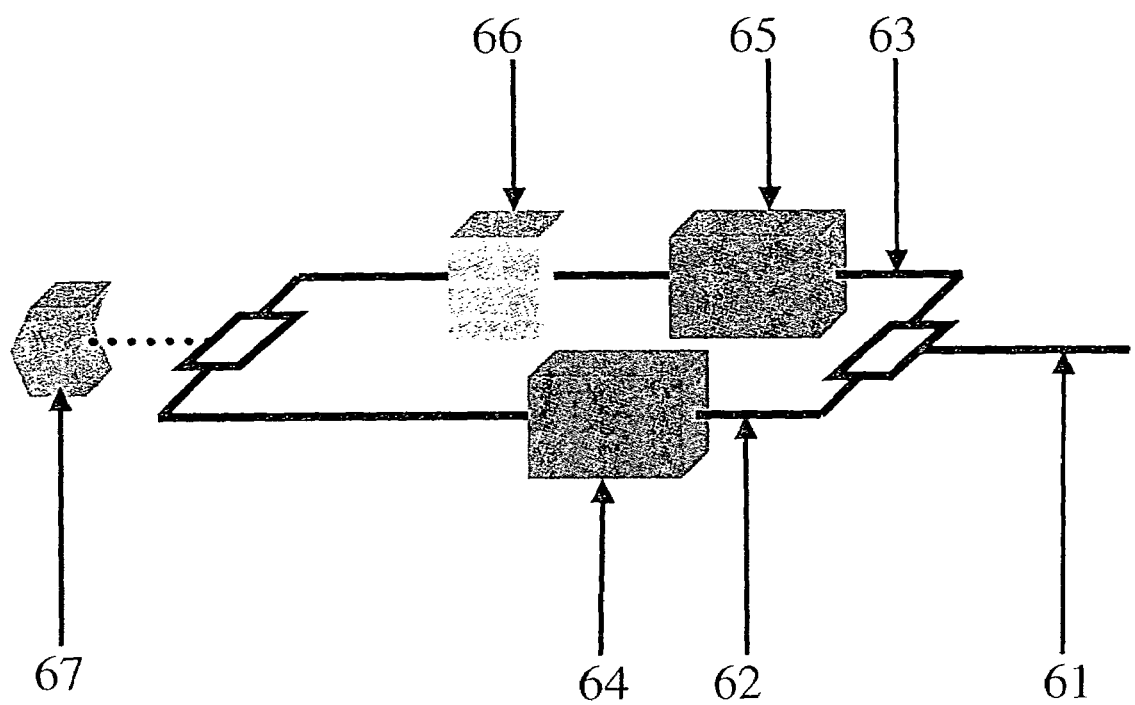
FIG. 6 shows schematically the mode of operation of a single detector in the MZI configuration with a phase matching element.

FIG. 5 shows schematically the mode of operation of embodiment 2. A laser beam 51 is split to two equi-intensity beams 52 and 53 using a beam splitter (not shown). Alternatively, we can use two different laser beams, of preferably equal intensity and identical state of polarization. However, the usage of two different lasers is likely to enhance the noise, since their fluctuations (in intensity and polarization) are not coordinated. We thus prefer to use a single beam, and split it into two beams of preferably equal intensity.

The two resulting beams propagate in parallel, and after crossing a polarizer 54 they impinge upon a detector 55 and a parallel dummy 56, respectively. Both beams proceed then through an analyzer 57 on their way to respective power meters 58 and 59. The overall output of the light intensity measurement is the difference between the two readings.

The advantage of using the parallel dummy is that there is no need to obtain a zero intensity at power meter 58 when $\delta T=0$. In the absence of IR radiation, the reading of the two power meters is the same, since they are exactly at the same temperature and all their physical properties are identical. Once the light intensity reading is different, one can easily extract the difference in temperatures (using equation (6)) for both the detector and the parallel dummy. In fact the difference in readings is given by the derivative of equation (6) with respect to the temperature.

Another advantage of Embodiment 2 is that fluctuations in the reading induced by instabilities of the temperature controller are eliminated. This is because both the detector and the dummy are placed on the same heat sink.

Embodiment 3

Embodiment 3 is another example for a single detector, this time utilizing the MZI configuration. A schematic description of this configuration is given in FIG. 6. A laser beam 61 is split to two equi-intensity beams, a reading beam 62 that passes through a detector 64 and a reference beam 63 that passes through a parallel dummy 65. A phase matching device 66 is added to one of the paths. In the case shown in FIG. 6, device 66 is added in the path of reference beam 63 without loss of generality. As explained in Embodiment 1 above, device 66 may be passive (i.e., of fixed properties), or active (i.e., made of an EO material whose degree of birefringence is controlled by an electric field). The beams are then brought together to interfere at a power meter 67. In the absence of IR radiation, the phase of the two beams should be identical (since the optical length they pass is identical), and therefore a constructive interference should be formed. The phase matching device is then used as a calibration tool to ensure the formation of constructive interference.

We apply an electric field to both the detector and the dummy, and thus the index of refraction of both deviates from the equilibrium value by:

$$\Delta n = \frac{1}{2} \cdot n_0^3 \cdot g \cdot \varepsilon_0^2 \cdot C c w^2 \cdot \left(\frac{E_0}{T-T_c}\right)^2 \quad (8)$$

All the properties in equation (8) are identical for the detector and the dummy, with one exception: the detector's temperature is higher by $\delta T$ due to the absorption of the IR radiation. Each beam accumulates along its way a phase of:

$$\phi = \frac{2 \cdot \pi \cdot L}{\lambda} \Delta n \quad (9)$$

where L is the length of the EO material. Since $\Delta n$ is not the same for both paths (due to the temperature difference), a phase difference of $\delta\phi$ between the two beams evolves. This phase difference is given by:

$$\delta\phi = \frac{2 \cdot \pi \cdot L}{\lambda} \delta(\Delta n) \quad (10)$$

and for a small value of $\delta T$ we can write the approximation $$\delta\phi = -\frac{2 \cdot \pi \cdot L}{\lambda} n_0^3 \cdot g \cdot \varepsilon_0^2 \cdot C c w^2 E_0^2 \frac{\delta T}{(T-T_c)^3} \equiv \quad (11)$$
$$-\frac{2 \cdot \pi \cdot L}{\lambda} * Y \cdot \frac{E_0^2}{(T-T_c)^3} \cdot \delta T$$

where Y is a material constant. This approximation is the derivative of equation (8) inserted into (10). Using typical KLTN values ($n_0$=2.18, g=0.14 meter$^4$/Coul$^2$, $C_{cw}$=100000), we find that Y is approximately $10^{-12}$ in MKS units. In the special case where L is 30 μm and $\lambda$ is 670 nm, we get a phase difference of:

$$\delta\phi \approx -90 \cdot \pi \cdot Y \cdot \frac{E_0^2}{(T-T_0)^3} \cdot \delta T \quad (12)$$

For a dc field of 3 KV/cm and operating temperature of 3.5° C. above $T_0$ we get a phase difference of approximately $0.2*\pi*\delta T$. Accordingly, a temperature difference of 5° C. will transform the originally constructive interference between the two beams into a destructive interference (=full scale). If the detector possesses 12 bit accuracy, this means that 1 mK can be detected. We note that if the thermal resistor is $10^6$ deg/Watt, the full-scale difference will be developed by a power of 5 μWatt. As pointed out above, the detector sensitivity can be reduced by a reduction in the electric field, if we wish to detect objects that produce higher IR power.

Embodiments 4–6

Embodiments 4–6 are essentially identical in structure to Embodiments 1–3, respectively. The difference lies in the material used. So far, we have limited ourselves to paraelectric materials, where the EO effect is quadratic. In embodiments 4–6 we utilize ferroelectric materials, in which the EO effect is linear with respect to the field. Another significant difference is the presence of spontaneous electrical polarization in the ferroelectric materials. The list of ferroelectric EO materials is quite long and includes, but is not limited to, LiNbO$_3$, LiTaO$_3$, SBN, KNSBN, BaTiO$_3$, NaNbO$_2$, KTN, SrTiO$_3$, and ZnO. A good reference citing such materials is "Introduction to Photorefractive Nonlinear Optics", by Pochi Yeh, Wiley & Sons, USA, 1993, pp. 26–29.

The electrical polarization of a ferroelectric material can be written as:

$$P = P_S + \in E, \quad (13)$$

where $P_S$ is the spontaneous electrical polarization and $\in E$ is the induced electrical polarization. Let us assume that the spontaneous polarization and the electric field are both in the Z direction, and limit the mathematical description (following Embodiments 1–3) to the cases where the EO effect is quadratic. This mathematical description does not limit, in any way, the generality of the present invention to these cases only. The index of refraction along the Z axis then becomes:

$$n = n_0 + \frac{1}{2}n_0^3 g P_s^2 + n_0^3 g P_s \varepsilon E + \frac{1}{2}n_0^3 g \varepsilon^2 E^2 \quad (14)$$

The first term on the left hand side is merely the equilibrium index of refraction. The second term represents the natural birefringence of the material, while the last two terms represent the induced birefringence. When the material is heated above the phase transition temperature, the spontaneous polarization diminishes to zero, and the two middle terms vanish. In this case equation (14) reduces to equation (3).

Returning to ferroelectric materials, there are two parameters in Equation (14) that are temperature dependent, $P_S$ and $\in$, and both change rapidly at temperatures just below $T_C$. It is then advisable to operate in this temperature range.

The implementation of the ferroelectric materials into Embodiments 1–3 is straightforward. In all cases, the light intensity reading depends on temperature via the index of refraction, and the latter can be translated into temperature using equation (14). This seems to be a more cumbersome procedure than in the paraelectric case. However, the very strong changes in $\in$ and $P_S$ just below the phase transition temperature enable extremely sensitive temperature detection.

Embodiment 7

Figure 7:
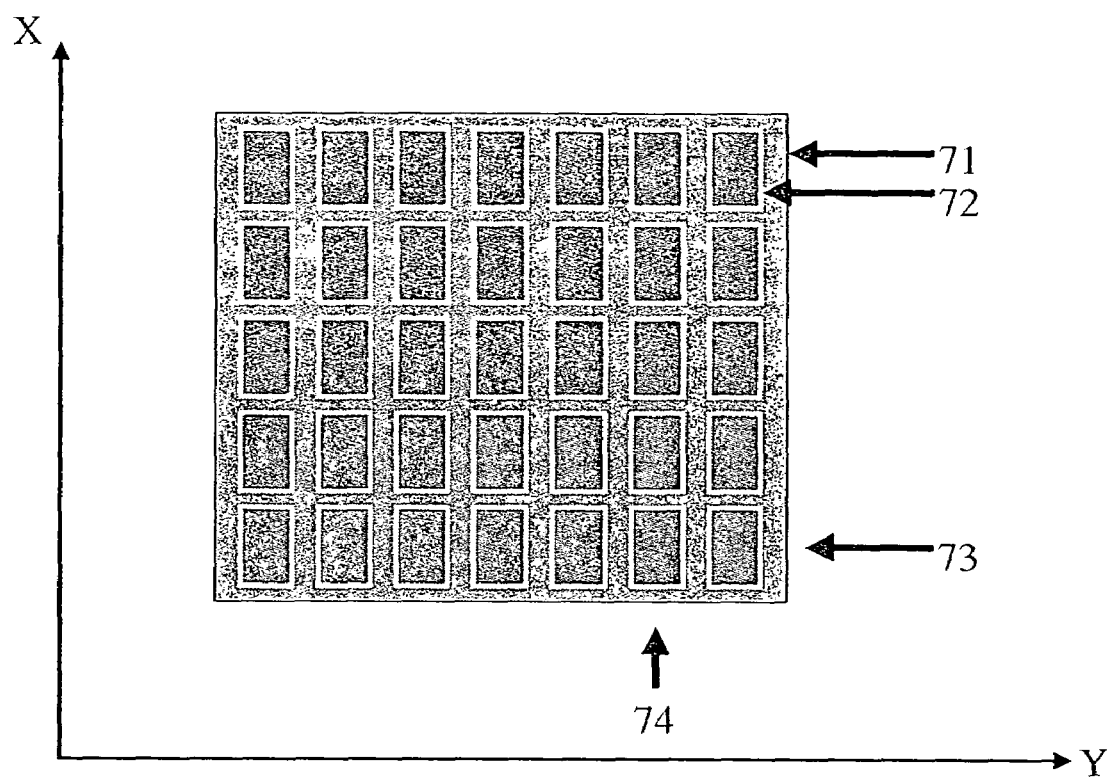
FIG. 7 is a schematic general description of a detector array.

This embodiment deals with an array of detectors that yields full thermal imaging. The embodiment utilizes the MZI configuration, and is limited to paraelectric materials (see Embodiment 10 for treatment of ferroelectric materials). The array consists of M rows and N columns of pixels. A pixel (single detector) is defined by the intersection of a row and a column. Here, a column is defined along the direction of propagation of the reading beam, i.e., along the X axis. Preferably, the entire array is made on a single EO wafer chip, on which contacts are applied to the pixels. FIG. 7 is a schematic representation of such a wafer 71, comprising an array of 7 columns and 5 rows. Rows 72 and 73 and column 74 are marked as exemplary.

In a preferred embodiment, the reading beam is confined in the Y-axis dimension, so that the beam is essentially waveguided along X. Therefore, the wafer is processed (using conventional techniques of microelectronics), in a way that the M columns of the array are separated from one another by a different medium, e.g., air. The Y dimension of the pixel can be made rather small, to optimize the heat capacity of the pixel. In a preferred embodiment, the pixel is 2 μm high (Z axis), 5 μm wide (Y axis) and 30 μm long (X axis). The beam thus propagates through a length of 30 μm in each pixel. In order to keep the IR sensitive area large (i.e., close to 50 μm×50 μm, which is a typical pitch size for un-cooled thermal imaging systems), we separate the centers of the columns by that distance (50 μm). The pixels are then covered with IR absorbing material of a large size (preferably 48×48 μm), part of which is above the vacant area between the columns. The absorber must then have a high thermal conductivity, so that all the heat that is absorbed will be transformed into the EO material. We hereafter refer to this formation of the absorber as "wings".

Figure 8:
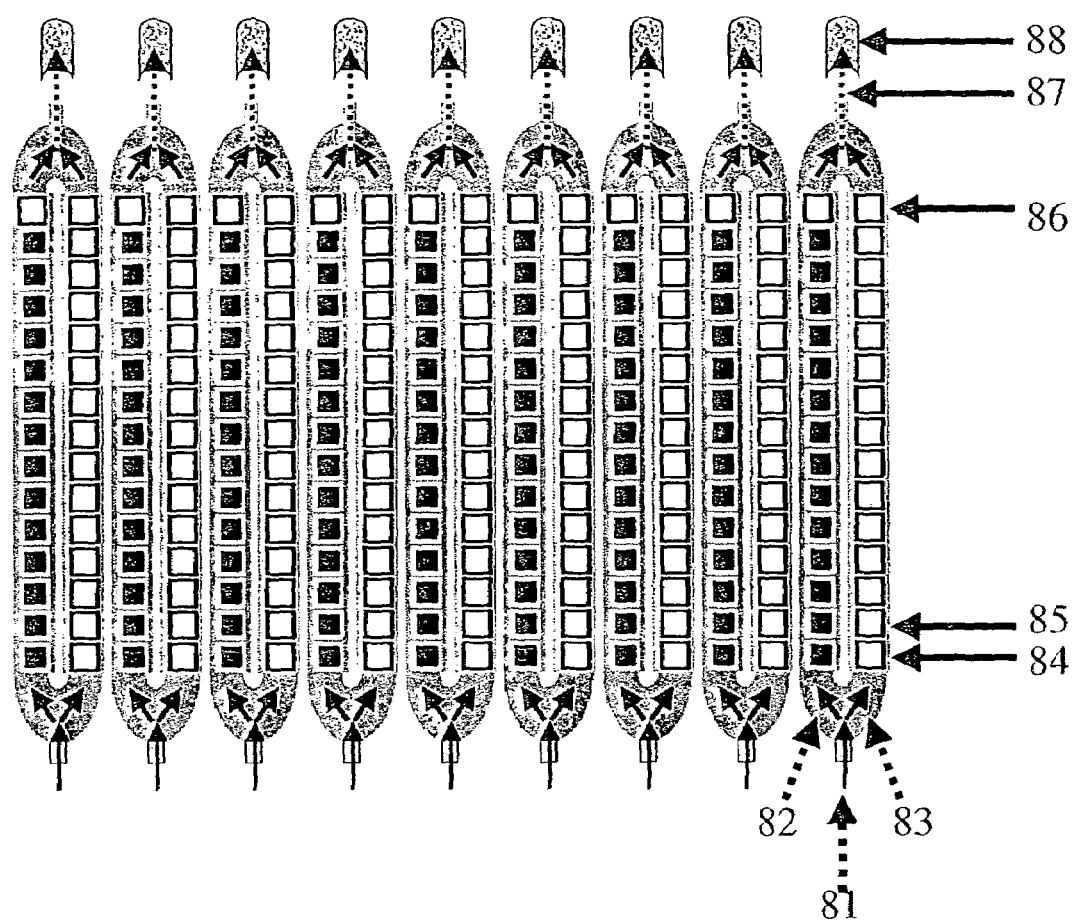
FIG. 8 is a schematic representation of a detector array in a MZI configuration in which half the pixels of the array are dummies.

In Embodiment 7, half of the array is made of columns of pixels, while the other half is made of columns of dummies. In FIG. 8, the pixels are marked by the black squares, while the dummies are marked by white squares. The columns are arranged in an alternating order of pixels and dummies. Each reading beam (for example, a reading beam 81) is split into two beams of equal intensity, one of which propagates through a column of pixels 82, while the other propagates through a column of dummies 83. The two beams are then combined at the end of the columns, to form an interference pattern 87 at a power meter 88.

In the absence of an electric field, the optical lengths of a column of pixels and a column of dummies are identical, leading to a constructive interference at the power meter. The last element of each column (whether it consists of pixels or dummies) is a serial dummy, which is used to ensure the constructive interference condition. This row of dummies is marked as 86 in FIG. 8. If, due to some process variations, material variations or other imperfections, the above-mentioned condition is not fulfilled for a given pair of columns, then an electric field is applied to the corresponding dummies of that last row, with the electric field chosen to satisfy the constructive interference condition.

As mentioned above, the pixels and the dummies are made of an EO material in the paraelectric phase. The absorption of heat is limited to the pixel path, and so a temperature difference between the two paths develops. Under the application of an electric field to a given row, such as row 84 in FIG. 8, each detector will measure a light intensity that is indicative of the temperature difference between the pixel and the dummy that are defined by the corresponding column and row. The relation between the measured light intensity and the temperature difference is the same as discussed above in Embodiment 3 and in equations (8)–(11).

At any given time, only a single pixel in each column should be biased. This means that the phase difference between the beams traveling along the pixel column and the beam traveling along the dummies column arises from no other source except the single biased pixel and its neighboring dummy.

It is quite obvious that the reading process of pixels in different columns is completely independent of each other. Preferably, the reading process is performed for one pixel of each column simultaneously. More preferably, these pixels are on the same row. In such a case, one can short all the contacts along each row. This parallel reading process enables a cheap measurement technique, with a prolonged measurement time (and correspondingly low level of noise). The reading process preferably starts at row 84, then proceeds to a row 85 and further up the array, until (but excluding) row 86. Once the entire array has been read it is possible to read a new frame, starting again from row 84.

In a preferred embodiment, a Multi Mode Interferometer (MMI) is used to split a single laser to several pairs of columns. This enables the use a single laser (or few lasers) for the entire array, thus lowering the cost of the product, and enabling easy coupling of light into paths that are physically close to one another. This is also valid for Embodiments 8 and 9 below.

Embodiment 8

Embodiment 8 also utilizes the MZI configuration to obtain an array of detectors for thermal imaging. In principle, Embodiment 8 is quite similar to Embodiment 7, but provides a significant increase of the Fill Factor. In Embodiment 7 each single detector pixel is directly compared with its neighbor, which is a dummy, i.e. radiation insensitive. Therefore, thermal variations of the substrate are cancelled out. Furthermore, the fact that the reference (dummy) is adjacent to the pixel diminishes the effects of fluctuations in material properties. In Embodiment 8 we significantly reduce the number of dummies, and push them to the periphery of the array, thus increasing the Fill Factor.

Figure 9:
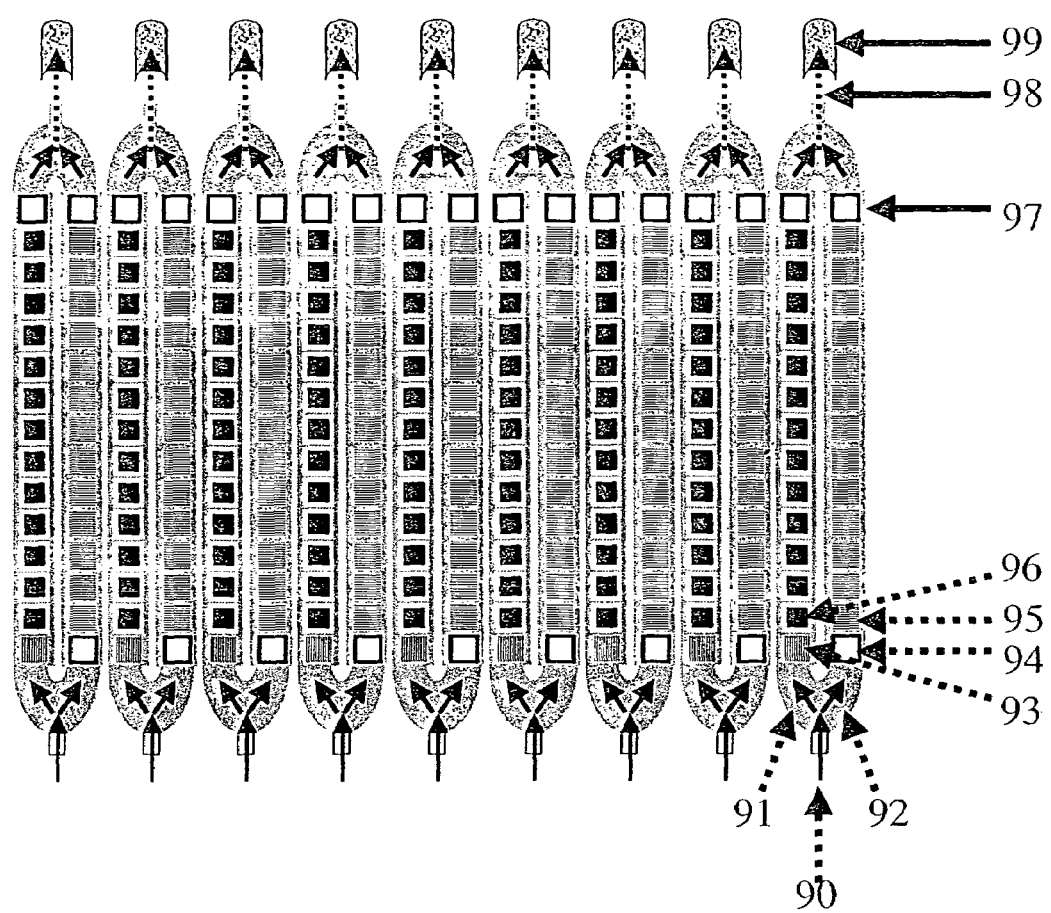
FIG. 9 is a schematic representation of a detector array in a MZI configuration in which a single dummy pixel is used for an entire adjacent column.

A schematic description of Embodiment 8 is given in FIG. 9. In FIG. 9, we mark temperature sensitive pixels as black squares or horizontal stripe squares, whereas dummies are marked by white squares or vertical stripe squares. As indicated below, the reading operation of a row is performed in two steps: First, a voltage is applied to the black colored pixels and to the white colored squares (dummies). Then the voltage is applied to the pixels marked by horizontal stripes and to the dummies marked by vertical stripes. We therefore describe the white square dummies as "matching" to the black square pixels. In a similar manner, the dummies marked by vertical stripes "match" the pixels marked by horizontal stripes.

To understand the operation of the device of FIG. 9, let us start with a general description. An upper row 97 is made of dummies, and is used to ensure constructive interference under the application of zero electric field to all the pixels in the array. This row fills exactly the same role of row 86 in Embodiment 7. The bottom row is made entirely of dummies (e.g. dummies marked by 93 and 94), and is used for reference only. The rest of the array is thermally active through the application of an absorbing layer on top (i.e., consists of pixels only).

Turning now to the question of operation, in order to read a specific pixel we have to apply an electric field to that specific pixel, and to the dummy on the adjacent column. For example, to read a pixel 95 we have to apply the electric field also to dummy 93. In a similar manner, to read pixel 96 we have to apply the electric field also to dummy 94. Generally speaking, in order to read a pixel marked with a black color the electric field must be also applied to its matching dummy, which is the white color dummy at the bottom row of the adjacent column. In a similar manner, in order to read a pixel marked with horizontal stripes we must also apply the electric field to the dummy marked by vertical stripes at the adjacent column.

Changes in the intensity reading will be a direct consequence of the phase difference along the two paths, which in turn are induced by the temperature difference between the pixel that we read and the reference dummy (which is now located at the bottom row). This is, of course, quite similar to Embodiment 7, except that a single dummy located at the bottom row serves as reference for each TSE pixel of an adjacent column. In other words, the same reference is used for the entire adjacent column, thus virtually doubling the Fill Factor of the array. If one desires to improve the correlation between the pixel and the dummy while keeping a high Fill Factor, it is possible to allocate a reference row of pixels for a given segment of the array, e.g., every 20 rows.

Since there are pixels on every column of the array, it is now impossible to apply the reading voltage to an entire row. Instead it has to be applied to the odd-numbered pixels along a given row (together with the even-numbered dummies in the bottom row), and only later to the even-numbered pixels along the same row (together with the odd-index dummies in the bottom row). Using the notation of FIG. 9, the voltage should be applied first to the horizontal striped pixels on each given row (together with the vertical striped dummies on the bottom row), and then to the fully black pixels of the same row (together with the fully black dummies at the bottom row). Hence the measurement time of each pixel is half the time obtained in Embodiment 7. Nevertheless, since the Noise Equivalent Temperature Difference (NETD) is inversely proportional to the Fill Factor, and proportional only to the square root of the bandwidth, the predicted NETD of Embodiment 8 is $\sqrt{2}$ smaller than in Embodiment 7.

Embodiment 9

Embodiment 9 is again an array of detectors, only this time we utilize the crossed polarizers configuration. The array consists of pixels (with the preferred dimensions mentioned in Embodiment 7 above), with a single last row (row 1006 in FIG. 10) made of dummies for calibration purposes. As in the above-mentioned cases, we limit the current discussion to paraelectric materials, and defer treatment of ferroelectric materials for later Embodiments. Optionally, a column of dummies may be added for reference.

Figure 10:
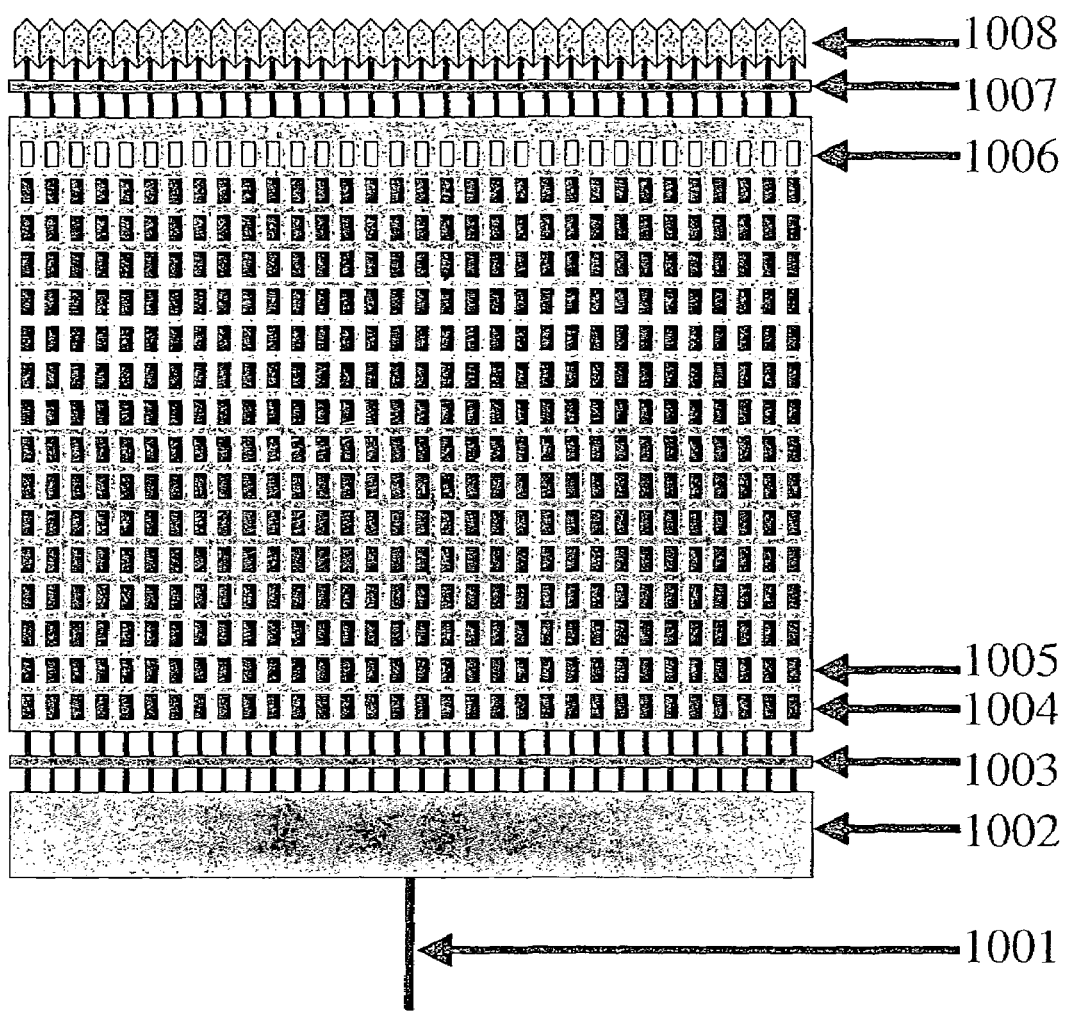
FIG. 10 is a schematic representation of a detector array in a crossed-polarizers configuration.

A schematic description of Embodiment 9 is presented in FIG. 10. A laser beam 1001 is introduced into an MMI 1002, which splits the beam into M beams of equal intensity, where M is the number of columns in the array (M=32 in the example of FIG. 10). The beams then pass through a polarizer 1003 to ensure they are linearly polarized. Since the crossed-polarizers configuration operates on the field induced birefringence of the EO material, it is essential that the beams will not be polarized either in the Z direction or in the Y direction. We may thus choose any other direction. Preferably, the beams are polarized in 45° to the Z-axis, so that the Y and Z components are of equal intensity. The beams then propagate along the column and through an analyzer 1007 to a row of power meters 1008.

We first apply a calibration process. Since the EO material is particularly sensitive to temperature changes close to the phase transition temperature, $T_C$, we set the heat sink to a temperature slightly above $T_C$. In such a case there might be a residual birefringence, and thus even in the absence of an electric field, the light intensity measured in a power meter 1008 would not be zero. We therefore use the last row of the array (1006 in FIG. 10), which is made entirely of dummies, to compensate for the native birefringence. We apply an electric field to each dummy along this row to null the light intensity reading of the power meter of the corresponding column.

The reading is performed for an entire row at a time, e.g. for row 1004. We apply voltage to the entire row and induce birefringence in the pixels belonging to that row. Due to this induced birefringence, the light intensity reading deviates from the zero value achieved during calibration. The extent of the birefringence depends, of course, on the temperature of the pixels, which in turn depends on the intensity of the absorbed IR radiation. Equations (3)–(6) are used to transform the light intensity reading into a temperature scale.

We now proceed to a next row 1005 and then row-by-row throughout the array until (but excluding) calibration row 1006, thus forming the entire image. At the end of each scan we repeat the calibration process, so that changes of the natural birefringence of the array (caused by fluctuations in the pixel's temperature) will be updated in the calibration information.

It is also important to address the issue of the stability of the temperature controller. As explained in Embodiment 2 above, the temperature of the heat sink is likely to fluctuate slightly. This issue was addressed in Embodiment 2 by adding a dummy alongside the detector (see FIG. 5), and using Equation 11 to conclude the IR radiation intensity. The same principle can be utilized in Embodiment 9 by adding a column of dummies at the array periphery. In such a case the reading of each pixel will be corrected by deducting the reading of the dummy from the same row. Again, Equation 11 will be used to analyze the thermal image.

Embodiments 10–12

Embodiments 10–12 are essentially identical to Embodiments 7–9, respectively, and therefore do not require a lengthy discussion. A schematic representation for these Embodiments is already given in FIGS. 8–10, respectively. As in the case of Embodiments 4–6, we now utilize ferroelectric EO materials, rather than paraelectric materials. This means that there is a temperature dependent spontaneous polarization of all the pixels and dummies within the array. Consequently, all pixels and dummies are birefringent even in the absence of an external electric field.

We now focus on Embodiment 9 to explain the method of operation in some details. We will use the schematic description of FIG. 8, and Equations (13) and (14) that describe the quadratic EO effect for ferroelectric materials (see above). We emphasize again that the current invention is in no way limited to ferroelectric materials in which the EO effect is quadratic. Indeed, similar equations can be written for other orders of the EO effect. The equations thus represent only a preferred embodiment.

We start the reading process with a calibration phase. This calibration is performed using row 86, which is made entirely of dummies. As explained in Embodiment 7 above, the role of this row is to guarantee a constructive interference of the two beams that travel along the column of pixels 82 and the columns of 83 dummies, respectively. In Embodiment 7 row 86 was required to compensate for imperfections of the material. In the case of Embodiment 10, the natural birefringence of all the pixels and the dummies needs to be compensated for. This is because the natural birefringence is temperature dependent, and there is a slight temperature difference between each pixel and its neighboring dummy, which is induced by the scene that we wish to observe. By the application of the appropriate voltage to the dummies at row 86 it is possible to compensate for that, and assure a constructive interference of the two beams at detector 88. We stress that it is possible to make row 86 of any EO material, as long as the required phase matching of the two beams is achieved.

Once the calibration process has been completed, we can read the array, starting at row 84. We do that by applying an electric field to this row (and this row only), thus increasing the electrical polarization of the dummies and pixels as indicated by Equation (13). It is important to note that the electrical polarization and the birefringence of the rest of the array is unchanged. It thus follows that any change in the light intensity is strictly correlated with the change in the index of refraction of the pixel and dummy of row 84, each of which can be described by Equation (14). The two differ through the values of $P_S$ and $\in$, which are determined by the temperature. The reading is thus identical to the one in Embodiment 6.

We then proceed to read row 85, and throughout the rest of the array until (but excluding) row 86. Special care must be taken with regard to the calibration process, since the results of this process depend on the observed scene they may well change quickly, thus deeming the calibration values inaccurate. We therefore suggest repeating the calibration process after short time intervals (e.g., after every 1 msec), even in the middle of the reading process of the frame (e.g., after each 10 rows).

The reading schemes for Embodiments 11 and 12 follow the same principle, and are therefore straightforward.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:
1. A thermal detection system comprising:
   a. a temperature sensing element (TSE) that includes an electro-optic (EO) material layer and characterized by an index of refraction;
   b. an electrical mechanism for inducing a change in said index of refraction, said index change correlated with a temperature of said TSE; and
   c. an optical reading mechanism for reading said refraction index change, thereby providing a reading of said TSE temperature.

2. The thermal detection system of claim 1, wherein said EO layer has a length axis, and wherein said optical reading mechanism includes a laser beam configured to propagate through said EO layer in a direction substantially along said length axis, and a power meter for reading a change in the intensity of said laser beam after said beam exits said EO layer, said intensity change correlated with said refraction index change and said TSE temperature.

3. The thermal detection system of claim 2, wherein said optical reading mechanism further includes a cross-polarizers configuration of two polarizers positioned on two sides of said TSE along said length axis, said polarizers configured to manipulate said laser beam in order to provide said intensity change.

4. The thermal detection system of claim 3, further comprising a parallel dummy immune to radiation induced temperature changes positioned in parallel with said TSE between said two polarizers, wherein said optical reading mechanism includes a first beam propagating through said TSE and a second beam propagating through said parallel dummy, and means to obtain output light intensity measurements based on said two beams and correlated with said TSE temperature through said index of refraction change.

5. The thermal detection system of claim 4, wherein said parallel dummy includes an EO material different from said TSE EO material.

6. The thermal detection system of claim 2, further comprising a parallel dummy immune to radiation induced temperature changes positioned in parallel with said TSE, wherein said optical reading mechanism further includes a Mach Zehnder Interferometer (MZI) reading configuration.

7. The thermal detection system of claim 6 wherein said MZI reading configuration includes a splitter for splitting said laser beam into two beams, a reading beam propagating through said TSE and a reference beam propagating through said parallel dummy, and means to obtain a combined output light intensity measurement based on said two beams and correlated with said TSE temperature through said index of refraction change.

8. The thermal detection system of claim 7, wherein said parallel dummy includes an EO material different from said TSE EO material.

9. The thermal detection system of claim 2, further comprising an optional calibrating mechanism connected in series with said TSE and used for calibrating said light intensity.

10. The thermal detection system of claim 9, wherein said calibrating mechanism is selected from the group consisting of a phase compensator and a serial dummy.

11. The thermal detection system of claim 1, further comprising an absorbing layer attached to said EO layer, whereby radiation emitted by a remote body and absorbed in said absorbing layer determines said TSE temperature.

12. The thermal detection system of claim 11, wherein said radiation is infrared radiation.

13. The thermal detection system of claim 1, further comprising a thermal link connecting said EO layer to a thermally conducting substrate that serves as a heat sink, and a temperature controller connected to said substrate and used for setting said substrate temperature.

14. The thermal detection system of claim 1, wherein said EO material is a ferroelectric material.

15. The thermal detection system of claim 14, wherein said ferroelectric material is in the paraelectric phase.

16. A thermal detection system comprising:
   a. a temperature sensing element (TSE) that includes an electro-optic (EO) material layer having a length axis and characterized by an index of refraction;
   b. an electrical mechanism for inducing a change in said index of refraction, said index change corresponding to a temperature of said TSE;
   c. an optical reading mechanism that includes a laser beam propagating through said EO layer along said length axis and having a light intensity that changes as a result of said refraction index change; and
   d. a power meter for measuring said light intensity change, whereby said detected light intensity change indicates said temperature of said TSE.

17. The thermal detection system of claim 16, further comprising an absorbing layer attached to said EO layer, whereby radiation emitted by a remote body and absorbed in said absorbing layer determines said TSE temperature.

18. The thermal detection system of claim 17, wherein said radiation is infrared radiation.

19. The thermal detection system of claim 16, further comprising a thermal link connecting said EO layer to a thermally conducting substrate that serves as a heat sink, and a temperature controller connected to said substrate and used for setting said substrate temperature.

20. The thermal detection system of claim 16, wherein said EO material is a ferroelectric material.

21. The thermal detection system of claim 20, wherein said ferroelectric material is in the paraelectric phase.

22. The thermal detection system of claim 16, further comprising a cross-polarizers configuration of two polarizers positioned on two sides of said TSE along said length axis, said polarizers configured to manipulate said laser beam in order to provide said intensity change.

23. The thermal detection system of claim 22, further comprising a parallel dummy immune to radiation induced temperature changes positioned in parallel with said TSE between said two polarizers, and an additional laser beam propagating through said parallel dummy, and means to obtain output light intensity measurements based on said two beams and correlated with said TSE temperature through said index of refraction change.

24. The thermal detection system of claim 23, wherein said parallel dummy includes an EO material different than said TSE EO material.

25. The thermal detection system of claim 16, further comprising a parallel dummy immune to radiation induced temperature changes positioned in parallel with said TSE in a Mach Zehnder Interferometer (MZI) reading configuration, said laser beam split by a splitter into a reference beam propagating through said parallel dummy and means to obtain a combined output light intensity measurement based on said two beams and correlated with said TSE temperature through said index of refraction change.

26. The thermal detection system of claim 25, wherein said parallel dummy includes an EO material different than said TSE EO material.

27. The thermal detection system of claim 16, further comprising an optional calibrating mechanism connected in series with said TSE and used for calibrating said light intensity.

28. The thermal detection system of claim 27, wherein said calibrating mechanism is selected from the group consisting of a phase compensator and a serial dummy.

29. A thermal imaging system having an array of pixels arranged in columns and rows, the system comprising:
   a. a plurality of temperature sensing elements (TSE) each having an electro-optic (EO) material layer and characterized by an index of refraction;
   b. an electrical mechanism for inducing a change in said index of refraction of each individual TSE, said refraction index change correlated with a temperature of said individual TSE;
   c. a plurality of dummies, wherein said electrical mechanism is applied to a pair composed of a TSE and a dummy; and
   d. an optical reading mechanism applied simultaneously to said TSE and said dummy of said pair, to measure their respective refraction index, thereby providing a reading of a temperature difference between said TSE and said dummy.

30. The thermal imaging system of claim 29, wherein said EO layer has a length axis, and wherein said optical reading mechanism includes a laser beam configured to propagate through said EO layer in a direction substantially along said length axis, and a power meter for reading a change in the intensity of said laser beam after said beam exits said EO layer, said intensity change correlated with said refraction index change.

31. The thermal imaging system of claim 30, wherein said TSEs are arranged in columns having a common front end and back end, and wherein said optical reading mechanism further includes a cross-polarizers configuration of two polarizers, one said polarizer positioned before said common front end and the other said polarizer positioned after said common back end of each said column, said polarizers configured to manipulate said laser beam in order to provide said intensity change.

32. The thermal imaging system of claim 31, wherein said beam includes two beams, one propagating through said TSE and the other propagating through said dummy.

33. The thermal imaging system of claim 32, wherein said pair includes a dummy adjacent to said TSE.

34. The thermal imaging system of claim 30, wherein said optical reading mechanism further includes a Mach Zehnder Interferometer (MZI) reading configuration in which a splitter splits said laser beam into two beams that propagate respectively through said TSE and said dummy of said pair, and means to obtain a combined output light intensity measurement based on said two beams and correlated with said TSE temperature through said index of refraction change.

35. The thermal imaging system of claim 34, wherein said pair includes a dummy adjacent to said TSE.

36. The thermal imaging system of claim 29, wherein each said TSE further includes a radiation absorbing layer attached to said EO layer, whereby radiation emitted by a remote body and absorbed in said absorbing layer determines said individual TSE temperature.

37. The thermal imaging system of claim 36, wherein said radiation is infrared radiation.

38. The thermal imaging system of claim 29, wherein each said TSE further includes a thermal link connecting said EO layer to a thermally conducting substrate that serves as a heat sink, and a temperature controller connected to said substrate and used for setting a substrate temperature.

39. A method for radiation sensing comprising the steps of:
  a. providing a temperature sensing element (TSE) that includes an electro-optic (EO) material layer and characterized by an index of refraction;
  b. exposing said TSE to radiation, thereby affecting the temperature of said EO material;
  c. electrically inducing a change in said index of refraction, said change correlated with said TSE temperature; and
  d. optically reading said refraction index change, thereby providing a reading of said TSE temperature.

40. The method of claim 39, wherein said radiation is IR radiation.

41. The method of claim 39, wherein said EO layer has a length axis, and wherein said step of optically reading includes propagating a laser beam through said EO layer in a direction substantially along said length axis, and reading an intensity of said beam after it exits said EO layer, said intensity correlated with said TSE temperature through said refractive index change.

42. The method of claim 41, wherein said step of optically reading further includes positioning two cross-polarizers on two sides of said TSE along said length axis, said polarizers configured to manipulate said laser beam and obtain said intensity reading.

43. The method of claim 42, wherein said step of optically reading further includes positioning a parallel dummy immune to radiation induced temperature changes in parallel with said TSE, and wherein said optical reading mechanism includes a first beam propagating through said TSE and a second beam propagating through said parallel dummy, and means to obtain output light intensity measurements based on said two beams and correlated with said TSE temperature through said index of refraction change.

44. The method of claim 41, wherein said step of optically reading includes reading an intensity change obtained in a Mach Zehnder Interferometer (MZI) reading configuration in which a parallel dummy immune to radiation induced temperature changes is positioned in parallel with said TSE, said laser beam split to sample both said TSE and said dummy.

45. The method of claim 39, wherein said EO material is selected from the group consisting of a paraelectric and a ferroelectric material.

46. The method of claim 39, further comprising the step of calibrating said light intensity by positioning an optional calibrating mechanism in series with said TSE.

47. The method of claim 39, wherein said calibrating mechanism is selected from the group consisting of a phase compensator and a serial dummy.

48. A method for thermal imaging comprising the steps of:
  a. providing a plurality of temperature sensing elements (TSE), each said TSE having an electro-optic (EO) material layer and characterized by an index of refraction;
  b. providing at least one dummy, wherein said TSEs and said at least one dummy are located in respective adjacent columns;
  c. electrically inducing a change in said index of refraction of each said TSE, said refraction index change correlated with a temperature of said TSE; and
  d. optically reading each said TSE refraction index change, thereby providing a reading of each said TSE temperature.

49. The method of claim 48, wherein said TSEs and said at least one dummy are arranged in an array of columns and rows, wherein said step of electrically inducing a change includes electrically applying an electric field to an entire row, and wherein said step of optically reading includes optically reading one said TSE and said at least one dummy.

50. The method of claim 49, wherein said EO layer has a length axis, and wherein said step of optically reading further includes propagating a laser beam through said EO layer in a direction substantially along said length axis, and reading an intensity of said beam after it exits said EO layer, said intensity correlated with said TSE temperature through said refractive index change.

51. The method of claim 50, wherein said TSE columns have a common front end and back end, and wherein said step of optically reading further includes providing a cross-polarizers configuration of two polarizers, one said polarizer positioned before said common front end and the other said polarizer positioned after said common back end of each said column, and wherein said polarizers are configured to manipulate said laser beam in order to obtain said intensity reading.

52. The method of claim 51, wherein said pixel pair includes a dummy pixel adjacent to said TSE.

53. The method of claim 50, wherein said step of electrically inducing a change in said index of refraction includes applying said electrical field to a pair composed of a said TSE and said at least one dummy, and wherein said step of optically reading further includes reading said inten sity through a Mach Zehnder Interferometer (MZI) reading configuration.

54. The method of claim 53, wherein said reading through said MZI reading configuration includes splitting said laser beam into two beams that propagate respectively through said TSE and said dummy of said pair, and combining said two beams into an exit beam after they exit said TSE and said dummy, said reading said intensity including reading an intensity of said exit beam.

55. The method of claim 48, wherein said EO material is selected from the group consisting of a paraelectric material and a ferroelectric material.

* * * * *